(12) United States Patent
Eyers et al.

(10) Patent No.: US 8,268,032 B2
(45) Date of Patent: Sep. 18, 2012

(54) GASKET FOR PROVIDING A SEAL BETWEEN TWO OBJECTS

(75) Inventors: William K. Eyers, Chobham (GB); Gordon T. Ayshford, Godalming (GB); Christina Goodrick-Meech, Portsmouth (GB); Beverley Dunstan, Eastleigh (GB); Ian H. Sutherland, Farnborough (GB)

(73) Assignee: General Electric Company, Schenectady, NY (US)

( * ) Notice: Subject to any disclaimer, the term of this patent is extended or adjusted under 35 U.S.C. 154(b) by 697 days.

(21) Appl. No.: 12/168,208

(22) Filed: Jul. 7, 2008

(65) Prior Publication Data

US 2010/0001477 A1    Jan. 7, 2010

(51) Int. Cl.
*B01D 46/00* (2006.01)
*F16J 15/02* (2006.01)

(52) U.S. Cl. .......... 55/502; 277/627; 277/644; 277/647; 277/918

(58) Field of Classification Search .......... 55/502; 277/626, 627, 641, 642, 644, 647, 648, 918
See application file for complete search history.

(56) References Cited

U.S. PATENT DOCUMENTS

| | | | |
|---|---|---|---|
| 2,693,374 A | 11/1954 | Wurzburger | |
| 3,147,015 A | 9/1964 | Hanback | |
| 4,033,593 A | 7/1977 | Molnar et al. | |
| 4,128,251 A * | 12/1978 | Gaither et al. | 277/644 |
| 4,168,237 A | 9/1979 | Pickett et al. | |
| 5,246,205 A | 9/1993 | Gillingham et al. | |
| 5,399,264 A | 3/1995 | Pulek et al. | |
| 5,630,593 A | 5/1997 | Swensen et al. | |
| 5,674,303 A | 10/1997 | Ter Horst | |
| 5,730,445 A | 3/1998 | Swensen et al. | |
| 5,997,006 A | 12/1999 | Westhoff et al. | |
| 6,457,725 B1 | 10/2002 | Jones | |
| 6,550,775 B2 | 4/2003 | Knapp | |
| 6,568,540 B1 * | 5/2003 | Holzmann et al. | 210/445 |
| 6,971,479 B1 * | 12/2005 | Urmson et al. | 184/3.1 |
| 2004/0194441 A1 * | 10/2004 | Kirsch | 55/497 |
| 2008/0224422 A1 * | 9/2008 | Halling | 277/644 |
| 2008/0284242 A1 * | 11/2008 | Ganzel | 303/114.1 |

FOREIGN PATENT DOCUMENTS

| | | |
|---|---|---|
| DE | 102004031609 A1 | 2/2006 |
| EP | 0921022 B1 | 3/2005 |

* cited by examiner

*Primary Examiner* — Robert Clemente
(74) *Attorney, Agent, or Firm* — Ernest G. Cusick; Frank A. Landgraff

(57) ABSTRACT

A gasket and sealing system are described herein. One aspect of the invention is a gasket for providing a seal between a first object and a second object. The gasket comprises a base portion for sealing engagement with the first object at a first location and a deflectable portion extending from the base portion. The deflectable portion has an end portion initially spaced from the first object. The deflectable portion is engageable with the second object for sealing therebetween upon engagement with and movement of the second object towards the first object. The end portion is engageable with the first object at a second location upon the second object being further moved towards the first object.

18 Claims, 4 Drawing Sheets

GASKET FOR PROVIDING A SEAL BETWEEN TWO OBJECTS

BACKGROUND OF THE INVENTION

This invention relates to a gasket for providing a seal between a first object and a second object.

Many types of assemblies utilize a gasket to fill the space between two objects, generally to prevent leakage between them while under compression. Gaskets can be quite useful, and often save money by allowing less precise mating surfaces on machined parts. Solid and closed-cell foam gasket materials may be used, however, these materials often require a high amount of compression force to ensure a tight seal and that force may damage the parts being joined and/or the gasket material itself. Open cell foam gaskets require less force to seal but are susceptible to leaks as fluids penetrate the open cells. Thus, there is a need for a gasket fabricated from solid or closed cell materials that requires less force to provide an effective seal.

BRIEF DESCRIPTION OF THE INVENTION

A gasket and sealing system are described herein. One aspect of the invention is a gasket for providing a seal between a first object and a second object. The gasket comprises a base portion for sealing engagement with the first object at a first location and a deflectable portion extending from the base portion. The deflectable portion has an end portion initially spaced from the first object. The deflectable portion is engageable with the second object for sealing therebetween upon engagement with and movement of the second object towards the first object. The end portion is engageable with the first object at a second location upon the second object being further moved towards the first object.

Another aspect of the invention is a gasket for providing a seal between a first object and a second object. The gasket comprises a base portion for sealing engagement with the first object at a first location and a deflectable portion extending from the base portion. The deflectable portion has an end portion initially spaced from the first object. The deflectable portion is engageable with the second object, for sealing therebetween, upon engagement with and movement of the second object towards the first object. The end portion is engageable with the first object at a second location upon the second object being further moved towards the first object. The deflectable portion comprises a first leg portion, a second leg portion, and a bight portion. The first leg portion extends from the base portion, the second leg portion is shorter than the first leg portion and the two leg portions are connected by the bight portion.

Another aspect of the invention is a sealing system comprising a mounting, a filter frame, and a gasket providing a fluid seal between the mounting and the filter frame. The gasket comprises a base portion for sealing engagement at a first location with one of the mounting and filter frame and a deflectable portion extending from the base portion. The deflectable portion has an end portion initially spaced from the one of the mounting and filter frame. The deflectable portion is engageable with the other one of the filter frame and mounting, for sealing therebetween, upon engagement with and movement of the other one of the filter frame and mounting towards the one of the filter frame and mounting. The end portion is engageable with the one of the filter frame and mounting at a second location upon the other one of the filter frame and mounting being further moved towards the one of the filter frame and mounting.

BRIEF DESCRIPTION OF THE DRAWINGS

These and other features, aspects, and advantages of the invention will be better understood when the following detailed description is read with reference to the accompanying drawings, in which.

DETAILED DESCRIPTION OF THE INVENTION

The effectiveness of a gasket in providing a fluid seal depends on the ability of the gasket to mould to the shape of the objects it is intended to seal. A force must be applied to one or both of the objects in order to seal the gasket. The amount of force required on a fixed size gasket is dependent on the hardness of the material used for the gasket, whether it is open or closed cell, and the amount of material compression required to obtain effective sealing. Typically, solid gasket materials such as solid rubbers require more force to seal than do foam materials, and open-cell foams require less force to seal than closed-cell foams, since with a closed cell foam the gas inside the cells must be compressed. When high forces are required to create a seal many problems may be encountered. The high force may cause damage to the objects themselves and/or to the gasket materials, and may be difficult to create and maintain. Thus, it is desirable to have a gasket design that can create an effective fluid seal with a reduced amount of force.

The gasket of this invention may be used in any assembly requiring a seal between two objects and is especially suited to those that would require a high clamping force (greater than 100 $kg_f$) to create a fluid seal using a traditional solid D-shaped gasket. Such traditional gaskets are made of many materials known to those in the art including but not limited to closed cell neoprene and plastic. In one embodiment the inventive gasket is used to provide a fluid seal between a filter media support and a mounting frame. The filter may be used for a number of applications including but not limited to gas turbine intake filtration, vehicle cab intake filtration, building HVAC air intake filtration, hydraulic fluid filters, and oil filters. The fluid being filtered may be a gas or a liquid.

Figure 1:
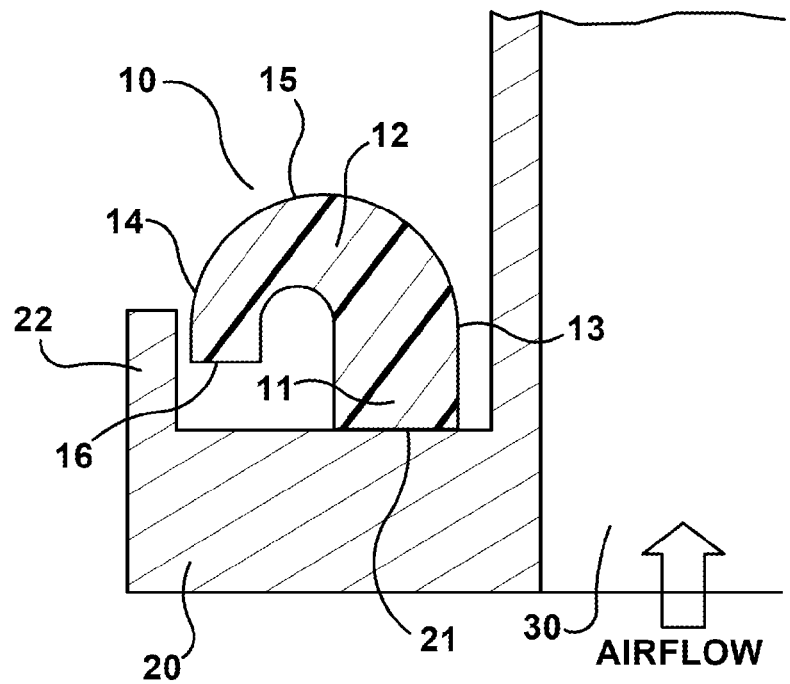
FIG. 1 is a cross sectional view of the inventive gasket attached to a filter support for a filter media.

FIG. 1 shows a cross-sectional view of the gasket 10 of one aspect of the invention, by way of example, used in a gas turbine inlet filter system. The gasket 10 has a substantially J-shaped, inverted profile and provides a fluid seal between a filter mounting and a filter frame. The mounting is part of a filter housing. The gasket 10 has a base portion 11 that is sealingly engaged with a first object 20 at a first location 21. The first object 20 is shown in this aspect as a filter support or mounting for a filter media 30. The gasket 10 has a deflectable portion 12 extending from the base portion 11. The deflectable portion 12 has a first leg portion 13 extending from the base portion 11. The deflectable portion 12 has a second leg portion 14 connected to the first leg portion 13 by a bight portion 15. The second leg portion 14 is shorter than the first leg portion 13. The deflectable portion 12 has an end portion 16 that is initially spaced from the first object 20. The filter support optionally includes a gasket stop 22.

Figure 2:
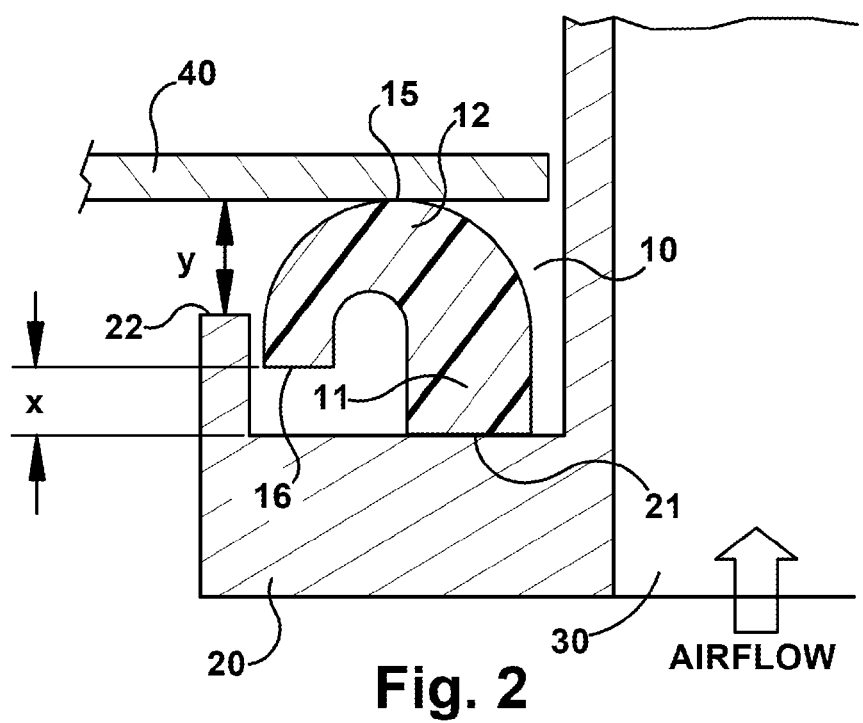
FIG. 2 is a cross sectional view of the inventive gasket attached to the filter support having a filter frame engaged with the gasket.

FIG. 2 shows a cross-sectional view of the gasket 10 having the base portion 11 sealingly engaged with the first object 20 at a first location 21. In this illustration a second object 40, shown in this embodiment as a filter mounting frame, has been moved into a first position relative to the first object 20 such that the second object 40 is engaged with the deflectable portion 12 of the gasket 10 at or near the bight portion 15. When the second object 40 is in the first position the gasket 10 has not been significantly deflected and thus the end portion 16 of the deflectable portion 12 remains spaced from the surface of the first object 20 by a distance, x. Furthermore, in this position the second object 40 is spaced from the gasket stop 22 by an initial distance, y.

Figure 3:
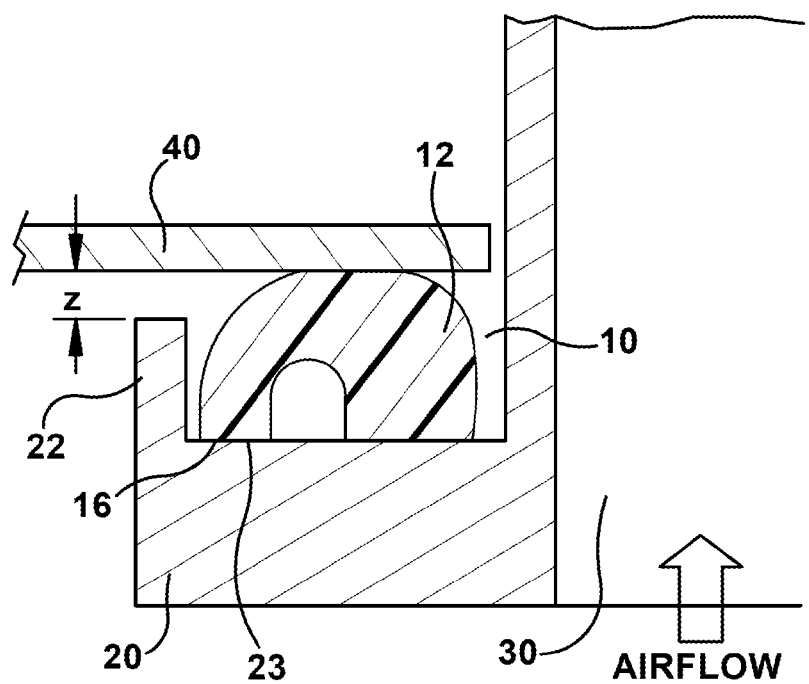
FIG. 3 is a cross sectional view of the inventive gasket attached to the filter support having the gasket deflected by the filter frame.

The second object 40 is further moved towards the first object 20. As this takes place the second object 40 is pressed against the deflectable portion 12 of the gasket 10, bending the gasket 10 until the end portion 16 forms a sealing engagement with the first object 20 in a second location 23, as shown in FIG. 3. During this bending the end portion 16 may move directly towards the first object or it may move laterally away from the base portion 11 while also moving towards the first object. The bending of the deflectable portion 12 of the gasket 10 enables the second object 40 to be moved towards the first object 20 and maneuvered into place without the application of high amounts of force, as might be required if the gasket required compression at this stage of assembly. When the second object 40 is in this second position there is still an offset of a distance, z between the second object 40 and the gasket stop 22, if present. The distance z is less than the distance between the second object 40 and the gasket stop 22 before the gasket 10 is significantly deflected, y. When the second object 40 is in this second position relative to the first object 20 the gasket 10 is not substantially compressed. At this stage of assembly, the force applied to the gasket 10 by the second object 40 has been absorbed predominantly by the bending of the deflectable portion 12 of the gasket 10. In this position the fluid seal between the first object 20 and second object 40 is present but may be minimally effective.

Figure 4:
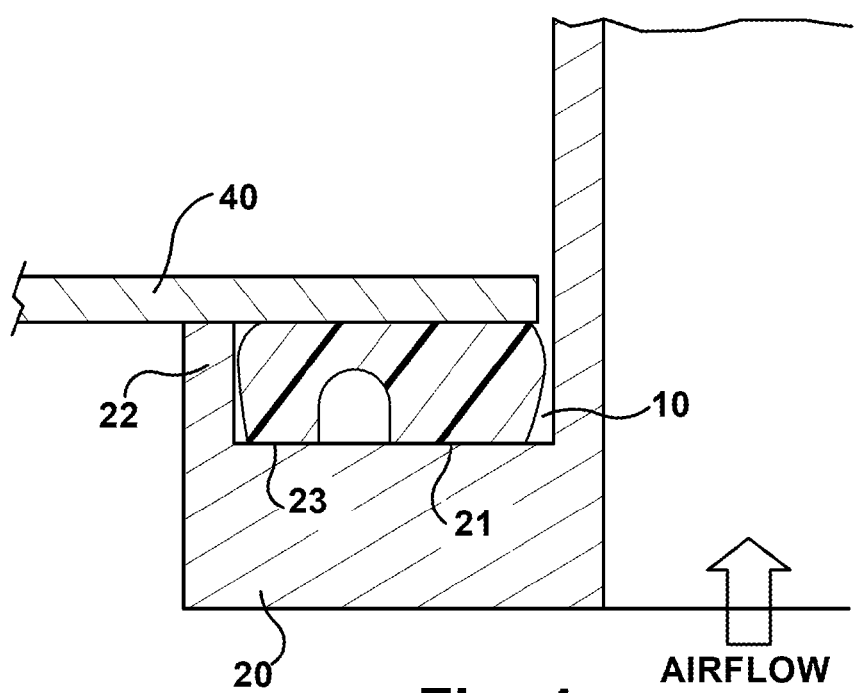
FIG. 4 is a cross sectional view of the inventive gasket compressed and the filter frame against the gasket stop.

FIG. 4 shows a cross-sectional view of the gasket 10 in a compressed state. The second object 40 has been moved further towards the first object 20 into a third position relative to the first object 20. In this position the gasket 10 has compressed and formed an effective fluid seal between the two objects. In the embodiment illustrated in FIG. 4, the second object 40 has made contact with the gasket stop 22, making the distance z effectively zero.

One significant advantage of the inventive gasket 10 is that because the end portion 16 forms a sealing engagement with the first object 20 in a second location 23, effectively a double seal is formed between the two objects. Often, the gasket 10 is applied to the first object 20 in the first location 21 with tape adhesive, which may not lay perfectly flat between the gasket 10 and the first object 20. There may be small ripples in the tape and gaps between the gasket 10 and the first object 20 in the first location 21 may result. The sealing engagement of the end portion 16 of the gasket 10 in the second location 23 ensures an effective seal, even if there are imperfections in the attachment of the gasket 10 to the first object 20 in the first location 21.

The gasket 10 is made of any material that can be fabricated into the desired shape and that will compress and form a seal upon the application of force including but not limited to solid rubbers and foam rubbers. Suitable closed cell foam and solid materials include ethylene propylene diene monomer (EPDM) rubber, neoprene rubber, isoprene rubber, silicone, and polyurethane. The gasket may be manufactured by any suitable means including but not limited to extrusion and molding. In one embodiment the joints of the gasket are vulcanized. This method produces a better joint than gluing, since vulcanization actually bonds the material together, whereas glue simply forms a film between the two faces of the joint. The vulcanized joint has similar properties to the parent material whereas many glues cause a hard spot at the joint, which can be detrimental to sealing.

One principal advantage of the inventive gasket 10 is its ability to bend and deflect without the application of excessive amounts of force when the second object 40 is being moved into place. When the inventive gasket 10 is used, for instance, to provide a seal between a gas turbine intake filter support as the first object 20 and a mounting frame as the second object 40, the mounting frame is not perfectly flat, but this is accommodated by the bending of the gasket 10 rather than by compression. The complete seal is created by compression of the seal after the bending has occurred. Known gaskets for this application relied primarily upon compression to accommodate the imperfections in flatness as well as the sealing and thus, a higher overall compression and load was required to position the second object and seal the gasket.

Known gasket designs that use a closed cell material, which is typically relatively hard, require high loads (force) to cause enough compression to effect a seal. This is undesirable because of potential damage to the objects being sealed while the force is being applied. Also, application of high forces to seal the objects can cause the cells in closed-cell gasket materials to rupture, which reduces the effectiveness of the seal as fluids may enter the ruptured cells and penetrate the gasket material. One known solution to this problem has been the use of two or more materials, where one material is relatively soft compared to the base material, to obtain a hybrid seal using less force. However, these hybrid gaskets require the use of open cell materials as the softer material and this makes the gasket susceptible to leaks, as fluids may penetrate those open cells. In contrast, the inventive gasket 10 may utilize a harder material, since the gasket first bends and then compresses and thus requires a reduced force to assemble and seal. Furthermore, if a closed cell material is used it may be compressed and sealed without rupturing the cells since less force is required to seal the gasket. In one aspect the inventive gasket uses a material with Shore 00 hardness of 20 to 30.

A further advantage of the reduced load required to seal the gasket 10 is that the clamping arrangement for the filter may be simplified. For instance, known gaskets often require high force to provide the required compression for a seal and thus must have large clamping mechanisms, which are expensive to fabricate and assemble. In contrast, the inventive gasket 10 requires less force to compress and seal and therefore may require either no clamping assembly, or a simplified mechanism that is less costly to fabricate and utilize.

The gasket 10 may be oriented to accommodate any differential pressure across the objects. For instance in filtration applications the base portion 11 may be adjacent to the high pressure side of the filter while the second leg portion 14 is adjacent to the low pressure side, preventing the differential pressure from opening the gasket 10.

Figure 5:
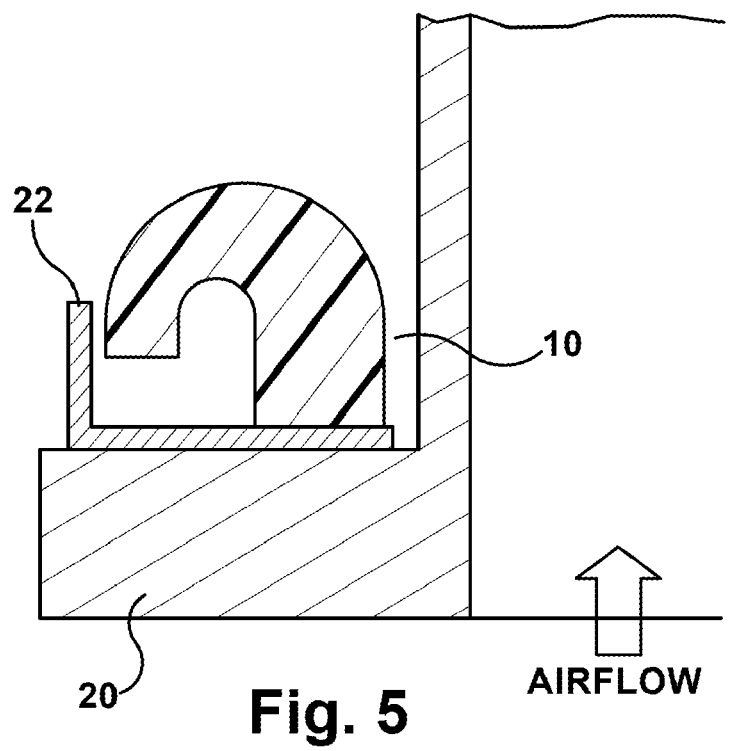
FIG. 5 is a cross sectional view of the inventive gasket having a gasket stop attached to the gasket.
Figure 6:
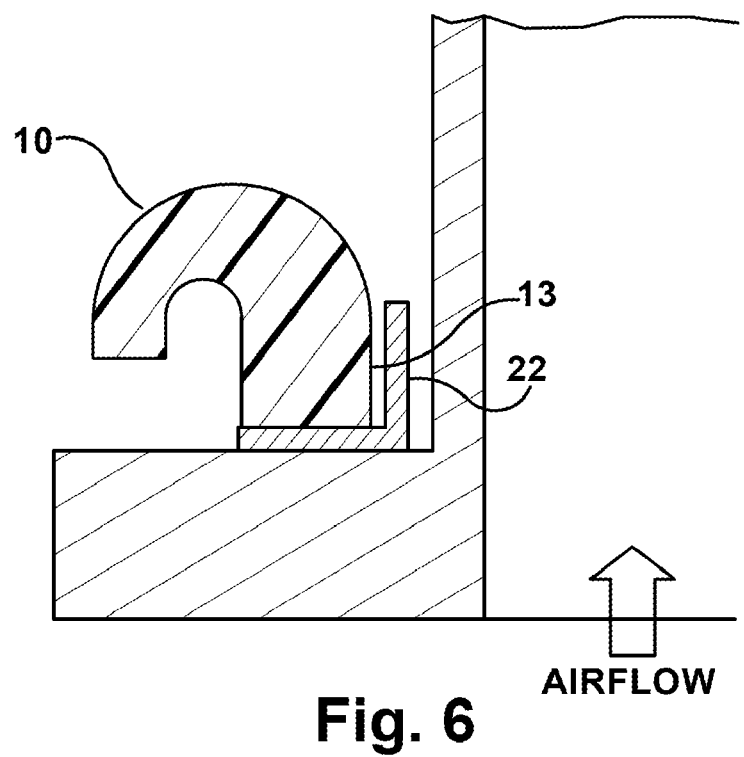
FIG. 6 is a cross sectional view of the inventive gasket having a gasket stop attached to the gasket and oriented adjacent to the first leg of the gasket.
Figure 7:
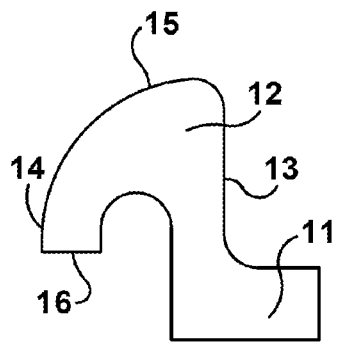
FIGS. 7 to 12 are cross sectional views of alternate embodiments of the inventive gasket.
Figure 8:
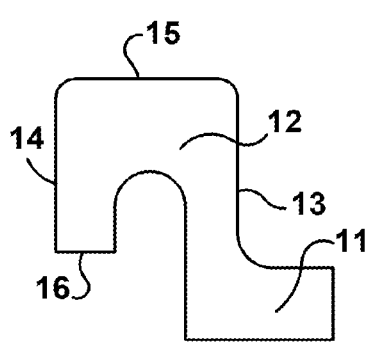
Figure 9:
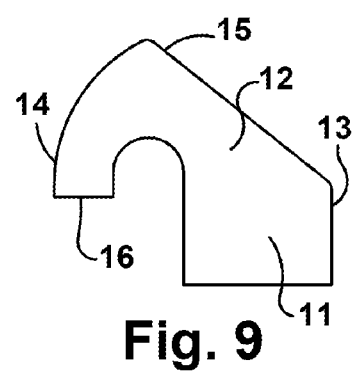
Figure 10:
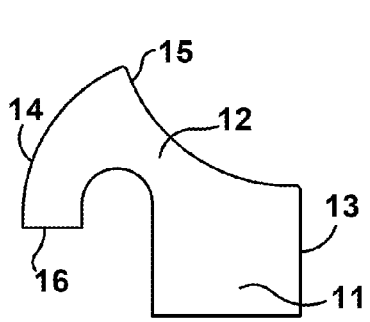
Figure 11:
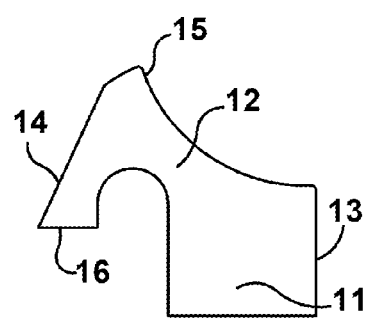
Figure 12:
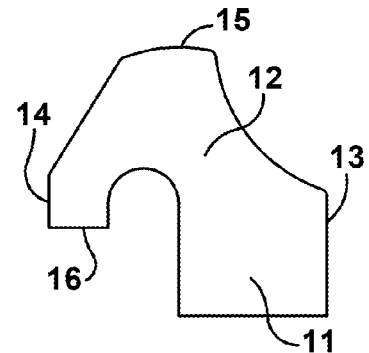

The gasket stop 22 is not required to create a seal between the two objects, but it may be included in the assembly. The gasket stop 22 limits the compression of the gasket 10 to a pre-determined limit, avoiding over-compression that can lead to damage of the gasket material, i.e., rupture of the cells in a closed cell foam. The amount of compression that would be acceptable varies depending on the material used to form the gasket. In one aspect the compression is limited to less than 50%. The gasket stop 22 also prevents the gasket 10 from collapsing. In addition, the height of the gasket stop 22 relative to the height of the gasket 10 may be designed to control the ratio of deflection and compression achieved in each application. The gasket stop 22 may be associated with one of the filter frame (first object) 20, the gasket 10, and the mounting (second object) 40. By way of example, the gasket stop 22 may be an integral part of the filter frame or first object 20, as shown in FIGS. 1-4. Alternatively, it may be a separate piece attached to the first object 20 or second object 40, or it may be attached to or integrated into the gasket 10 as shown in FIG. 5 and FIG. 6. If integrated into the gasket 10, the gasket stop 22 may be formed as a two-part molding in which the stop is molded from a hard plastic and then the soft (compressible) portion of the gasket 10 is molded directly onto the gasket stop 22. Alternatively, the gasket stop 22 and gasket 10 could be produced as separate parts that are joined together either before or during assembly of the gasket 10 to the first object 20. Furthermore, the gasket stop 22 may be placed anywhere that it will effectively control the placement of the second object 40 and limit the compression of the gasket 10. FIGS. 1-5 show the gasket stop 22 adjacent to the second leg portion 14 of the deflectable portion 12, however, as shown in FIG. 6, the gasket stop 22 may alternatively be adjacent to the first leg position 13.

The basic shape of the inventive gasket 10 includes the elements previously recited, however, it may be tailored in both shape and size to accommodate the particular intended use. FIGS. 7-12 show cross-sectional views of a variety of embodiments that might be utilized, each with a base portion 11 and a deflectable portion 12 extending from the base portion 11, the deflectable portion 12 having a first leg portion 13 extending from the base portion 11 and a second leg portion 14 connected to the first leg portion 13 by a bight portion 15. The second leg portion 14 is shorter than the first leg portion 13 such that the deflectable portion 12 has an end portion 16 that is initially spaced from the first object 20. Typically, the base portion 11 is wider, having a larger cross-sectional area than the second leg portion 14. Though not required, this is advantageous because it provides adequate surface area for contact with the first object 20 to enable good adhesion between the base portion 11 and the first object 20 when they are attached with adhesive. Furthermore, the wider base portion 11 helps to prevent the gasket 11 from rolling over during bending and compression.

This written description uses examples to disclose the invention, including the best mode, and also to enable any person skilled in the art to practice the invention, including malting and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gasket for providing a seal between a first object and a second object, the gasket comprising:
    a base portion attached to the first object at a first location;
    a deflectable portion extending from the base portion and having an end portion initially spaced from the first object, the deflectable portion engageable with the second object for sealing therebetween upon engagement with and movement of the second object towards the first object, and the end portion engageable with the first object at a second location upon the second object being further moved towards the first object, wherein the second location and first location are coplanar; and
    a gasket stop oriented to limit the compression of the gasket during movement of the second object towards the first object.

2. The gasket of claim 1 wherein the gasket stop is associated with one of the first object, the gasket, and the second object.

3. The gasket of claim 1 wherein the gasket stop limits the compression of the gasket to less than fifty percent.

4. The gasket of claim 1 wherein the gasket is fabricated of a closed cell material.

5. The gasket of claim 4 wherein the closed cell material is selected from the group consisting of ethylene propylene diene monomer (EPDM) rubber, neoprene rubber, isoprene rubber, silicone, and polyurethane.

6. The gasket of claim 1 wherein the gasket is fabricated of a material having a Shore 00 hardness of 20 to 30.

7. The gasket of claim 1 wherein the gasket is fabricated for use in a gas turbine inlet filtration system.

8. A gasket for providing a seal between a first object and a second object, the gasket comprising:
    a base portion attached to the first object at a first location;
    a deflectable portion extending from the base portion and having an end portion initially spaced from the first object, the deflectable portion engageable with the second object for sealing therebetween upon engagement with and movement of the second object towards the first object, and the end portion engageable with the first object at a second location upon the second object being further moved towards the first object, wherein the second location and first location are coplanar, wherein the deflectable portion comprises a first leg portion, a second leg portion, and a bight portion, the bight portion being engageable with the second object, wherein:
    the first leg portion extends from the base portion;
    the second leg portion is shorter than the first leg portion; and
    the two leg portions are connected by the bight portion.

9. The gasket of claim 8 wherein the base portion has a larger cross-sectional area than the second leg portion.

10. A sealing system comprising a mounting, a filter frame, and a gasket providing a fluid seal between the mounting and the filter frame, the gasket comprising:
    a base portion attached to one of the mounting and filter frame at a first location; and
    a deflectable portion extending from the base portion and having an end portion initially spaced from the one of the mounting and filter frame, the deflectable portion engageable with the other one of the filter frame and mounting for sealing therebetween upon engagement with and movement of the other one of the filter frame and mounting towards the one of the filter frame and mounting, and the end portion engageable with the one of the filter frame and mounting at a second location upon the other one of the filter frame and mounting being further moved towards the one of the filter frame and mounting, wherein the second location and first location are coplanar.

11. The sealing system of claim 10 wherein the deflectable portion comprises a first leg portion, a second leg portion, and a bight portion that is engageable with the filter frame, wherein:
the first leg portion extends from the base portion;
the second leg portion is shorter than the first leg portion; and
the two leg portions are connected by the bight portion.

12. The sealing system of claim 11 wherein the first leg portion has a larger cross-sectional area than the second leg portion.

13. The sealing system of claim 10 wherein the gasket is fabricated of a closed cell material.

14. The sealing system of claim 13 wherein the closed cell material is selected from the group consisting of ethylene propylene diene monomer (EPDM) rubber, neoprene rubber, isoprene rubber, silicone, and polyurethane.

15. The sealing system of claim 10 further comprising a gasket stop oriented to limit the compression of the gasket during sealing.

16. The sealing system of claim 15 wherein the gasket stop is associated with one of the filter frame, the gasket, and the mounting.

17. The sealing system of claim 15 wherein the gasket stop limits the compression of the gasket to less than fifty percent.

18. The sealing system of claim 10 wherein the gasket provides a seal for a gas turbine intake filtration system.

* * * * *